Dec. 1, 1953 — L. PETERS — 2,660,761
METHOD FOR RECRYSTALLIZING OR RESTABILIZING ORIENTED AMORPHOUS RUBBER HYDROCHLORIDE FILM
Filed Jan. 16, 1951
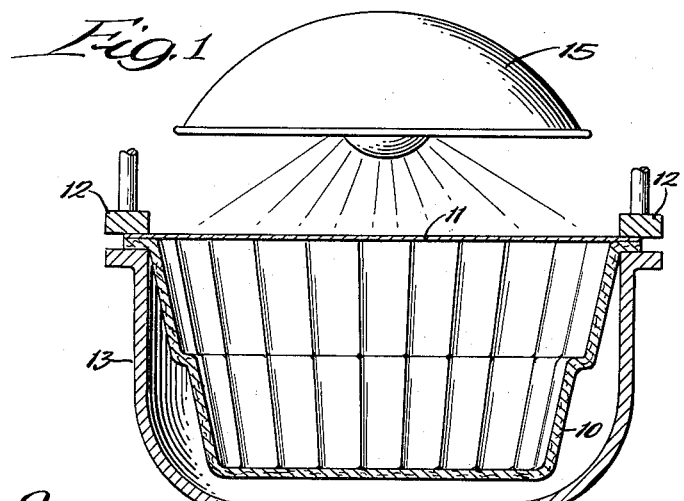
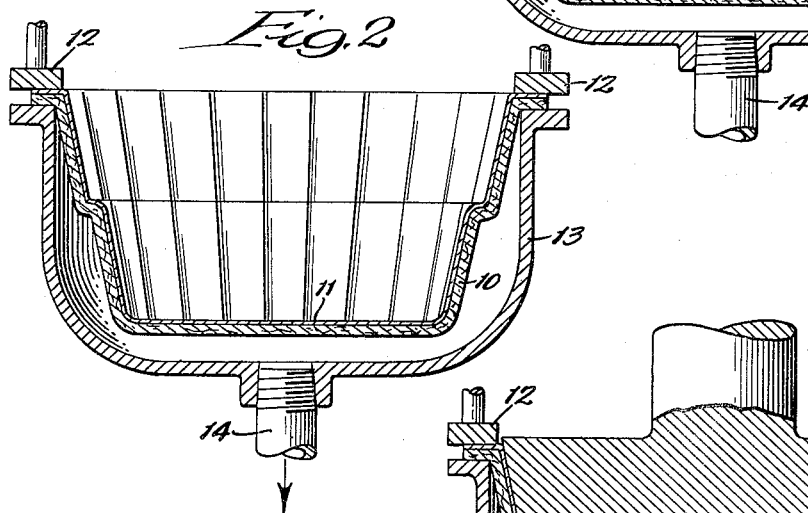
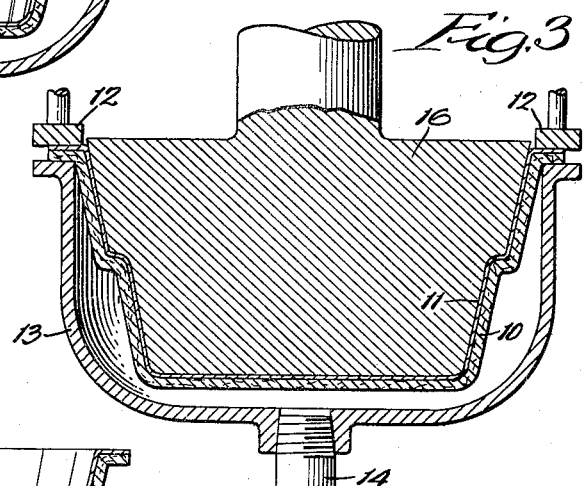
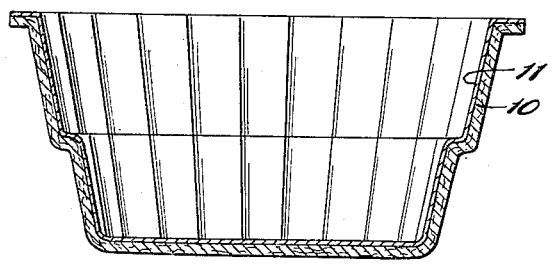
INVENTOR:
Leo Peters,
BY
Dawson & Ooms,
ATTORNEYS.

Dec. 1, 1953  L. PETERS  2,660,761
METHOD FOR RECRYSTALLIZING OR RESTABILIZING ORIENTED
AMORPHOUS RUBBER HYDROCHLORIDE FILM
Filed Jan. 16, 1951  2 Sheets-Sheet 2
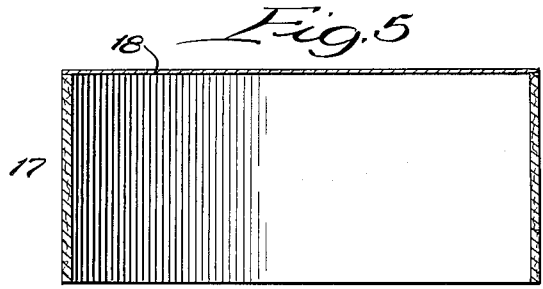
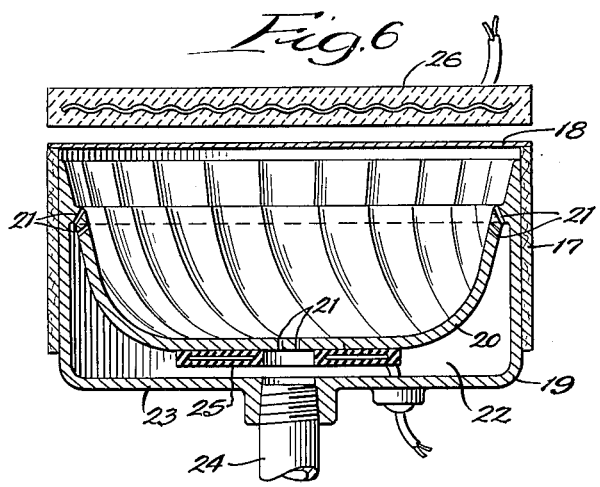
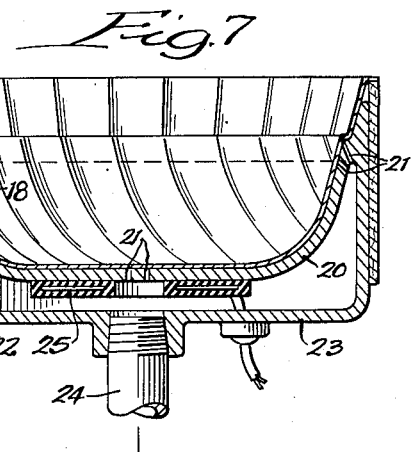
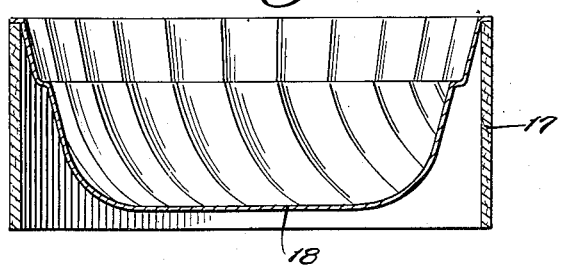
INVENTOR:
Leo Peters,
BY
Dawson & Ooms
ATTORNEYS.

Patented Dec. 1, 1953

2,660,761

UNITED STATES PATENT OFFICE 2,660,761

METHOD FOR RECRYSTALLIZING OR RE-STABILIZING ORIENTED AMORPHOUS RUBBER HYDROCHLORIDE FILM

Leo Peters, Evanston, Ill.

Application January 16, 1951, Serial No. 206,305

9 Claims. (Cl. 18—56)

This invention relates to a method for recrystallizing or restabilizing oriented amorphous rubber hydrochloride film, and more particularly to a method for changing a stretched portion of rubber hydrochloride film from its amorphous state to a restabilized, set, or recrystallized state within a very brief time. The invention is particularly useful for recrystallizing or dimensionally stabilizing amorphous rubber hydrochloride film which has been stretch-lined into and against the walls of either a preformed package cavity or of a metal cavity serving as a mold to shape a package liner.

Rubber hydrochloride film has been described in many publications and its characteristics and properties are well-known. The film is usually marketed in its crystalline state and under normal room temperatures always returns to this state. In this state the film is non-tacky, easy to handle, and dimensionally stable even though it has stretch and recovery. However, in its amorphous state, the film is highly ductile, dimensionally unstable, very tacky (so much so that it seals on self-contact), and has both great stretch and recovery. Because of these characteristics the amorphous film must be handled with great care and dispatch and, in applications where fast setting or restabilizing is required, the speed of recrystallization becomes a real problem.

It is known also that the temperatures required for maximum speeds in recrystallization from the amorphous state are found in the temperature range of about 140° to 160° F. The product is generally sold under the trade-name "Pliofilm" and the producer of this product and other parties have published detailed instructions and outlined the use of specific methods and apparatus for heating rubber hydrochloride film to its amorphous state and then recrystallizing and dimensionally restabilizing it. Such methods, however, do not bring about the recrystallization or restabilization within the short-time periods that are needed to make such methods practicable on a high-speed package forming and filling line.

Some of these past applications were, for example, designed solely to dimensionally stabilize film which was to be oriented uniformly along strictly length and width dimensions in a flat plane. The objective usually was to produce thereby a uniform tensilized result throughout the entire flat sheet, with predetermined amounts of stretch along the length and width of the film, and then set the film at these predetermined points against any recovery. No diagonal, curved, angular, or annular directions of stretch of non-uniform lengths and widths were involved in these applications. They were, of course, interested in a speedy recrystallization and restabilization of the amorphous film, but the methods they taught all involved holding the film in oriented condition while it passed through temperature zones heated to the ideal recrystallizing temperatures of 140° to 160° F. The temperatures in these applications were all produced by radiant heat within apparatus such as heated ovens, tunnels, or under hooded banks of infrared lamps.

Other applications which have used the peculiar stretch-recovery-recrystallizing characteristics of amorphous rubber hydrochloride film have been those involving the stretch-wrapping or stretch-covering of articles. High speed in recrystallization has not been obtained in any of these applications. After such articles have been stretch-wrapped no further processing of the film takes place.

Under these methods the fastest recrystallizing time known for amorphous rubber hydrochloride film was approximately thirty seconds. While this is conceded to be fairly fast by comparison with the many minutes required when recrystallization takes place at room temperatures, it would be slow in comparison with a speed of say three seconds or less.

Such past (thirty seconds or more) recrystallizing speeds, if used on a high-speed packaging and filling line running at sixty packages per minute and with each package occupying only four inches of the line's length, would require ten feet of the line's length with correspondingly long accessory apparatus to hold the amorphous film in oriented condition, temperature-treat it, and recrystallize it. By most any standards that is concededly a long stretch of packaging line to be concerned with but a single phase of the line's operation.

The problem is further complicated by the need of providing a liner for preformed, highly contoured package cavities. In such cavities of highly irregular interiors it is desired to provide a liner of rubber hydrochloride film which fits tightly, permanently and in crease-free and fold-free form within the cavity walls and without the use of adhesive for attaching the film to the walls. In such a structure the highly contoured cavity serves as a mold to shape the package contents and it is necessary that the liner or film set tightly against the walls without forming folds or creases or else the complete mold effect is destroyed. Obviously the mold effect would be frustrated if the liner, after being stretched, recovered and pulled away from the cavity walls at any point. This would result not only in a spoiled mold but also in a reduction to an unknown quantity of the cubic contents of the cavity.

In the use of radiant heating methods for recrystallizing amorphous rubber hydrochloride film, great care and control in the processing has been necessary due to fluctuating room temperatures, variations in film thickness at various points of elongation, differing temperatures of the package materials, differing impacts of radiating heat on the oriented film due to differing contour lines on the cavity walls, etc. Further, the radiant heating method, as heretofore pointed out, requires a relatively long time.

The problem of stretch and orientation involved in heat-stretch-lining a package cavity, particularly a cavity of generally rectangular or square shape and having contoured walls, with a rubber hydrochloride film are more complex than they are with a simple two-way stretch and orientation on a flat plane of film. In a cavity such as that described, a multiplicity of directions and elongations for the stretch are involved; and the elongations may vary from 10% to 500% and the directions of stretch may be in practically all planes and at all angles. These various lengths and directions of stretch result in corresponding variations in recovery strengths at various points on the stretched film, making it imperative that absolute and permanent stabilization and recrystallization be achieved. And the quicker this is done the better, in order to eliminate completely any possible distortion of the cavity liner which might otherwise take place if any recovery tendencies remained unarrested and unstabilized in the oriented film.

The methods used heretofore, using radiant heat for the recrystallization process, in addition to being relatively slow, were not wholly satisfactory with highly contoured cavities unless the temperature of recrystallization was controlled by force-circulation of the heated air within the cavity, this being important to assure that proper uniform temperature was actively maintained at all points on the film regardless of the contours. This, of course, necessitated additional care and equipment for the recrystallization process.

There has long been a need for a safe, sure, extremely fast, easily controllable, and simple method for recrystallizing and restabilizing oriented amorphous rubber hydrochloride film.

An object of the present invention is to provide a method for rapid recrystallization or restabilization of rubber hydrochloride film after the same has been stretched to a desired contour. A further object is to provide a method whereby an oriented amorphous rubber hydrochloride film is recrystallized and restabilized in three seconds or less. A further object is to provide a method for achieving high speed of recrystallization after the film has been stretched into and being held within a cavity and adjacent the cavity walls. Yet another object is to provide a method for recrystallizing such film while it is being held at non-uniform lengths of elongation and in multiple directions of orientation. A still further object is to recrystallize and restabilize oriented amorphous rubber hydrochloride film by means of conducted specific temperatures applied to the film through direct physical contact between the film and the heat-conducting instrument. A further object is to provide a method which is positive and uniform in its application of a heat or range of temperature to oriented amorphous film and which is not influenced by the fluctuating character of the surrounding elements or by the non-uniform characteristics of the film. A more specific object is to provide a method for recrystallizing a cavity-lining amorphous film in three seconds or less to provide permanent dimensional stability of the film at room temperatures. Other objects and advantages will appear as the specification proceeds.

In one phase of my invention, a rubber hydrochloride film is stretched to provide, say, a recess or depletion therein and, while so stretched, a heat-conductive material such as, for example, a metal die head is pressed into the recess so as to contact the surface of the film within the recess, the die head being maintained at the temperature desired for recrystallization of the film, say, at about 140° to 160° F. The contact may be for a second or two and it is found that such direct contact of the heat-conducting metal against the inner surface of the film brings about an almost instantaneous setting or crystallization of the film. It will be understood that the heat-conducting member may engage either the inside or the outside surface of the film portion forming the recess or cavity. Such direct contact of the heat-conducting member for a brief instant seems to be sufficient to completely recrystallize and restabilize the stretched portion of the film.

I have discovered that the use of specific heat conducted through a metal die or object shaped to fit precisely the shape of the package cavity and the bringing of the conducting die and the amorphous oriented film into direct physical contact with each other within the desired range of about 140° to 160° F. will recrystallize and restabilize amorphous rubber hydrochloride film in three to two seconds or less.

The bringing of the heat-conducting die and the amorphous film into direct contact with each other may be accomplished by any method which will effectuate the contact. In the case of film-lining a package cavity, this may be done by either of two methods:

*a.* If the package cavity is preformed, the amorphous film may first be stretch-lined into the cavity and then the recrystallizing heat conducted by and contact made with the film by a male die shaped to fit the cavity's shape.

*b.* In the case of a package cavity which is not preformed but is to be formed by the liner itself suspended within a hollow tubular supporting wall, the film may be stretch-lined and shaped directly against a female die.

In the carrying out of the process, it is important that there be a positive and direct contact between the heated metal member which conducts heat to the film, and I prefer also to have the heated member brought into contact with all or a substantial portion of the stretched film portion which is to be set. With the method described it will be noted that a minimum of apparatus is needed and that only about one foot of the filling line's length is needed for the stabilizing or recrystallizing of the film. Further, the thickness of the film (within the range of .0008" to .002") or the amount of plasticizer in the film (within the usual ranges) makes no appreciable difference in the speed of recrystallization produced under the new method.

The invention may be carried out in various types of apparatus. The invention is illustrated herein in connection with specific forms of apparatus by the accompanying drawings, in which—

Figure 1 is a vertical sectional view of apparatus which may be employed in the carrying out of my invention; Fig. 2, a view similar to Fig. 1 but showing the film drawn downwardly within the cavity of the porous mold; Fig. 3, a view similar to Fig. 2, but showing a die pressed into the mold; Fig. 4, a vertical sectional view of the finished lined mold; Fig. 5, a vertical sectional view of a modified form of structure in which a plastic film is secured to a tubular support; Fig. 6, a vertical sectional view showing the structure of Fig. 5 received within heated mold apparatus; Fig. 7, a view similar to Fig. 6, but showing the film drawn downwardly into contact with a figured mold; and Fig. 8, a vertical sectional view showing the finished package with the molded film therein.

In the illustration given in Figs. 1 to 4, 10 designates a pulpwood mold having its sides provided with mold designs. 11 designates a plastic film such as, for example, rubber hydrochloride film, applied to the top of the pulpwood mold 10 and sealed thereagainst by the pressure members 12. A suction bowl 13 is provided with a conduit 14 leading to a source of suction and encloses the sides and bottom of the porous pulpwood mold 10. An infra-red lamp 15 is supported about the film 11. Radiant heat from the infra-red lamp of approximately 250° F. is applied to the film to change it from the crystalline state to the amorphous state. A vacuum is then drawn through the pores of the mold walls 10, draw-stretching the film down into the cavity and against the walls of the mold 10, as illustrated in Fig. 2. While the film is held in this oriented and cavity-lining condition by the vacuum, a metal die 16, shaped to the inside dimensions of the cavity and conducting temperatures between 140 to 160° F., is lowered into the cavity and into contact with the film liner. After contact for 2 seconds, the die is withdrawn and then later the vacuum is removed. The finished product shown in Fig. 4, consisting of the pulpwood mold, is provided with a film liner 11 which is completely recrystallized and rests smoothly, tightly, but in non-adhering relationship with the cavity walls of the mold 10.

In the modification shown in Figs. 5 to 8, inclusive, the tube 17 is provided at its top with a plastic sheet 18 formed of rubber hydrochloride film or other suitable plastic material. The tube was placed over a female die 19, which is die-shaped to fit within the paper tube and which is provided with a die wall 20 contoured to give the final form of the plastic film liner. The wall 20 is provided with apertures 21 establishing communication between the interior of the wall 20 and the chamber 22 provided between wall 20 and the outer vacuum retainer wall 23. A pipe 24 leads to a source of vacuum. Below the wall 20 is an electric heater 25, and above the mold 19 may be placed an electrically-heated plate 26. After heating the plastic liner 18, the suction may be applied and the film drawn to the liner position illustrated in Fig. 7. After the film is in contact with the wall 20 heated to 140° to 160° F. for about 2 seconds, the vacuum was turned off and the paper tube, with its liner, removed from the die. It was found that the film was completely recrystallized and restabilized in a shape conforming to the shape and contours of the die wall 20, the final structure being illustrated in Fig. 8.

A specific example illustrating the process described in connection with Figs. 1 to 4 is set out in Example I, and a specific example illustrating the process in connection with Figs. 5 to 8 is set out in Example II hereafter.

In addition to the examples set out above, the following may be set out:

Example I

The rubber hydrochloride film employed was .0014 inch thick and was laid over a preformed rectangular package cavity formed of molded pulpwood and having contoured figured walls and approximately the following dimensions: length 3", width 2", depth 2". The film was held in place over the mouth of the cavity with a pressure pad while radiant heat from an infra-red lamp of approximately 250° F. was applied to the film to change it from the crystalline state to the amorphous state. A vacuum of 5 inches of mercury was then drawn through the pores of the cavity walls draw-stretching the film down into the cavity and against the walls. While the film was held in this oriented and cavity-lining condition by the vacuum, an aluminum male die, shaped to the precise inside dimensions of the cavity and conducting temperatures between 140° to 160° F., was lowered into the cavity and into contact with the film liner. Contact was maintained for 2 seconds and then withdrawn. One second later the vacuum was removed.

The resulting film liner was completely recrystallized and restabilized and rested smoothly, tightly, and in a coterminous but non-adhering relationship against the cavity walls. It resulted in a smooth and perfectly fitting yet removable liner for a highly irregularly-shaped cavity.

Example II

The same film as in Example I was fastened with an adhesive to the upper edge of a round hollow open-end paper tube whose dimensions were: 2½" diameter, 1½" height, .08" wall thickness. The paper tube with its top end thus covered with rubber hydrochloride film was placed over a steel female die shaped to fit inside the paper tube and having a cavity contoured to form the final form of the rubber hydrochloride film liner. The steel die had an opening leading to a vacuum pump. After placing the covered tube over the steel die and with the die heated to 140° to 160° F., the film was heated with the radiant heat to its amorphous state. Then a vacuum of 5 inches of mercury was used to draw the amorphous film down into the die cavity and against the entire surface of the heated die cavity's walls. The vacuum was continued for 2 seconds and then turned off. The resulting film was completely recrystallized and restabilized in a shape conforming to the shape and contours of the die cavity. The paper tube with its depending fully-shaped liner was then removed from the die.

In the forming of a liner for a package, a porous container formed of molded pulpwood, or similar material in which the pores are quite small and distributed uniformly or widely over the area of the container, may be employed. Vacuum may be applied to the under side of the container so as to draw a rubber hydrochloride film secured across the top of the container down into the container and into contact with the inner walls thereof. If desired, superatmospheric pressure may be employed for this purpose. While the liner is thus in stretched condition within the cavity, the heated die head may be introduced to bring it into contact with the inner surface of the stretched film. The methods and means for forming a porous container are described in greater detail in my copending application Serial No. 200,058, filed December 9, 1950. The present invention may be employed advantageously to set or recrystallize the film formed by any of the methods described in said application by bringing the heated member into contact with either the inside surface or the outside surface of that portion of the film which has been stretched.

While in the foregoing specification I have set out in considerable detail specific steps which illustrate phases of my invention, it will be understood that such details of procedure may be varied widely by those skilled in the art without departing from the spirit of my invention.

I claim:

1. In a process for forming a permanent recess in a rubber hydrochloride film, the steps of stretching the film while in an amorphous state to provide a recess, and bringing into contact with the stretched film a heat conductor maintained at a temperature of about 140 to 160° F. for setting the film in said stretched condition.

2. In a process for providing a rubber hydrochloride film with a permanent pocket, the steps of stretching the film while in an amorphous state to form said pocket, and bringing a metal member, heated to about 140° to 160° F., into contact with the stretched portion of said film to set the film in said stretched condition.

3. In a process for forming a permanent cavity in a rubber hydrochloride film, the steps of stretching the film while in an amorphous state to form a cavity having irregular side walls, and applying a heated die member, heated to about 140° to 160° F., and having irregular surfaces conforming to the irregular walls of said cavity to cause said surfaces to engage said walls direct, and withdrawing said die after said film has been recrystallized in said stretched condition.

4. In a process for forming a permanent cavity in a rubber hydrochloride film, the steps of stretching the film at a temperature of about 250° F. while in an amorphous state to form a cavity while providing a hollow die, heated to about 140 to 160° F., for engaging the outer surfaces of said cavity wall, and continuing the stretching of said cavity portion of the film to bring the cavity wall into contact with said hollow die for recrystallizing the film in said stretched condition.

5. In a method for forming a lined container, the steps of placing a rubber hydrochloride film upon an air-porous container, pressing the film against the interior walls of the container to cause them to conform to the contours thereof, and then contacting a conductor maintained at a temperature of about 140 to 160° F. directly with the stretched walls of said film to set said film in said stretched condition against the walls of the container.

6. In a method for forming a lined container, the steps of placing a rubber hydrochloride film upon an air-porous container, applying suction upon the outer surface of the container to draw said film tightly against the inner surface of the container, and then contacting a conductor maintained at a temperature of about 140 to 160° F. with the stretched portion of the film to recrystallize it in said stretched condition.

7. In a method for forming a lined container, the steps of securing a rubber hydrochloride film about the edge portion of a pulpwood container having pores therethrough, applying suction to the film while so held about its edges to draw the film inwardly against the walls of the container so as to conform to the contours thereof, and while the film is so held, bringing the temperature of the stretched portion of said film through contact with a metal body to 140 to 160° F. to set it permanently in said stretched condition.

8. In a method for forming a plastic liner having a cavity therein, the steps of stretching a portion of a rubber hydrochloride film at a temperature of about 250° F. to provide a cavity, holding said stretched portion of the film in extended position, and then contacting the cavity walls of the film with a metal heat conductor maintained at a temperature of about 140 to 160° F. in contact with said surface whereby said film is crystallized within a few seconds.

9. In a method for forming a cavity in a rubber hydrochloride film, the steps of stretching the film while in an amorphous state to form a cavity having irregular walls and while holding said film in said stretched condition, bringing into contact with a stretched irregular surface of said film a die heated to a temperature of about 140° to 160° F. to permanently set said film in said stretched condition in less than three seconds.

LEO PETERS.

References Cited in the file of this patent

UNITED STATES PATENTS

| Number | Name | Date |
| --- | --- | --- |
| 2,328,798 | Gardner | Sept. 7, 1943 |
| 2,444,420 | Borkland | July 6, 1948 |